Oct. 5, 1965  H. J. HEIJN  3,210,735
ARITHMETIC ELEMENT FOR DIGITAL COMPUTERS
Filed Oct. 14, 1959  4 Sheets-Sheet 1 herman jacob heijn INVENTOR

BY

AGENT

Oct. 5, 1965 H. J. HEIJN 3,210,735
ARITHMETIC ELEMENT FOR DIGITAL COMPUTERS
Filed Oct. 14, 1959 4 Sheets-Sheet 2

INVENTOR
herman jacob heijn
BY
AGENT

Oct. 5, 1965  H. J. HEIJN  3,210,735
ARITHMETIC ELEMENT FOR DIGITAL COMPUTERS
Filed Oct. 14, 1959  4 Sheets-Sheet 3

|   | $t_1$ | $t_2$ | $t_3$ | $t_4$ | $t_5$ | $t_6$ | $t_7$ | $t_8$ | $t_1$ |   |
|---|---|---|---|---|---|---|---|---|---|---|
| a | x | o | o | o | o | o | s | s | s | a |
| b | y | y | y | o | o | o | o | o | c | b |
| c | o | o | x | x | (xy) | o | o | o | o | c |
| d | o | o | x | x | x | o | o | o | o | d |
| e | o | o | o | o | y | o | o | o | o | e |
| f | o | o | x | x | x | x | x | o | o | f |
| g | o | o | o | o | y | y | y | o | o | g |
| h | o | o | x | x | (xy) | (xy) | (xy) | o | o | h |
| i | o | x | o | y | o | $s=2(xy)-x-y$ | o | $c=-(xy)+x+y$ | o | k |

FIG. 8

|   | $t_1$ | $t_2$ | $t_3$ | $t_4$ | $t_5$ | $t_6$ | $t_1$ |   |
|---|---|---|---|---|---|---|---|---|
| a | o | o | $c_u$ | o | o | o | o | a |
| b | o | o | $c_u^*$ | $c_u^*$ | $c_u^*$ | o | o | b |
| c | x | x | x | o | o | o | $x_1$ | c |
| d | y | y | y | o | s | s | s | d |
| e | $c_i$ | $c_i$ | $c_i$ | o | o | o | $c_u^*$ | e |
| f | x | o | o | o | o | o | $x_1$ | f |
| g | y | o | o | o | s | s | s | g |
| h | $\bar{c}_i$ | o | o | o | o | o | $\bar{c}_u^*$ | h |
| k | o | $x+y-\bar{c}_i$ | o | $s = x+y+c_i -2c_u$ | o | $c_u^*$ | o | k |

FIG. 9

INVENTOR
herman jacob heijn
BY
AGENT

| № | A | B | C |
|---|---|---|---|
| 1 | 0 | 0 | 0 |
| 2 | 1 | 1 | 1 |
| 3 | $x$ | $x$ | $x$ |
| 4 | $\bar{x}$ | $-x+1$ | $-x+1$ |
| 5 | $xy$ | $-(xy)+x+y$ | $x-\bar{y}$ |
| 6 | $x \vee y$ | $(xy)$ | $x+y$ |
| 7 | $xy \vee \bar{x}\bar{y}$ | $-2(xy)+x+y+1$ | — |
| 8 | $xyz$ | $(xyz)-(yz)-(zx)-(xy)+x+y+z$ | $x-\bar{y}-\bar{z}$ |
| 9 | $xy \vee z$ | $-(xyz)+(xz)+(yz)$ | $x-\bar{y}+2z$ |
| 10 | $xy \vee \bar{x}z$ | $-(xy)+(xz)+y$ | — |
| 11 | $xy \vee xz$ | $-(xyz)+(yz)+x$ | $-2\bar{x}+y+z$ |
| 12 | $xyz \vee \bar{y}\bar{z}$ | $(xyz)-2(yz)-(zx)-(xy)+x+y+z+1$ | — |
| 13 | $xyz \vee \overline{xyz}$ | $-(yz)-(zx)-(xy)+x+y+z+1$ | — |
| 14 | $xyz \vee \bar{x}\bar{y}z$ | $2(xyz)-(yz)-(zx)-2(xy)+x+y+z$ | — |
| 15 | $x \vee y \vee z$ | $(xyz)$ | $x+y+z$ |
| 16 | $x\bar{y} \vee \bar{x}y \vee z$ | $2(xyz)-(xz)-(yz)+z$ | — |
| 17 | $yz \vee zx \vee xy$ | $-2(xyz)+(yz)+(zx)+(xy)$ | $x+y-\bar{z}$ |
| 18 | $\bar{y}z \vee y\bar{z} \vee xy$ | $(xyz)+(yz)-(zx)-(xy)+x$ | — |
| 19 | $\bar{y}z \vee \bar{z}x \vee \bar{x}y$ | $(yz)+(zx)+(xy)-x-y-z$ | — |
| 20 | $xyz \vee \bar{x}\bar{z} \vee \bar{y}\bar{z}$ | $2(xyz)-2(yz)-2(zx)-(xy)+x+y+z+1$ | — |
| 21 | $\bar{x}yz \vee x\bar{y}z \vee xy\bar{z}$ | $-5(xyz)+4(yz)+4(zx)+4(xy)-3x-3y-3z$ | — |
| 22 | $xyz \vee \bar{y}\bar{z} \vee \bar{z}\bar{x} \vee \bar{x}\bar{y}$ | $3(xyz)-2(yz)-2(zx)-2(xy)+x+y+z+1$ | — |
| 23 | $xyz \vee x\bar{y}\bar{z} \vee \bar{x}y\bar{z} \vee \bar{x}\bar{y}z$ | $4(xyz)-2(yz)-2(zx)-2(xy)+x+y+z$ | — |

FIG. 10

United States Patent Office 3,210,735
Patented Oct. 5, 1965

3,210,735
ARITHMETIC ELEMENT FOR DIGITAL
COMPUTERS
Herman Jacob Heijn, Eindhoven, Netherlands, assignor to North American Philips Company, Inc., New York, N.Y., a corporation of Delaware
Filed Oct. 14, 1959, Ser. No. 846,289
Claims priority, application Netherlands, Oct. 17, 1958, 232,377
2 Claims. (Cl. 340—172.5)

The invention relates to a logical member provided with microcontrol and built up from preferably annular cores made of a magnetic material having a substantially rectangular hysteresis loop the cores being arranged according to a matrix from which the information, which is stored in binary code in a row, can be read and transferred to a buffer storage, while the information stored in the buffer storage can be transferred to a row of the matrix. Such a memory is described in "Philips' Technical Review," volume 20, (1958/59), pages 193–208. From, for example, "Nachrichtentechnische Fachberichte," volume 4, (1956), pages 115–117, it is also known that rings made of a rectangular magnetic material can be used to form logical circuit arrangements. In the article quoted, H. Gillert has described an example of an adder and subtractor built up from such rings. It is an object of the present invention to provide method and means for building logical circuit arrangements which are materially simpler than the circuit arrangements described by H, Gillert, inter alia because they require a lesser number of current supply suorce. According to the invention, the information stored in the buffer storage can be transferred by coincidence simultaneously to at least two rows of the matrix while furthermore the information from at least two rows, which is provided with integral factors, can be transferred simultaneously to the buffer register, so that a linear function having integral coefficients is obtained of a number of variables, their negations and of values such as $(xy)$, $(xyz)$, $(\bar{x}yz)$, and so on, where $(xy)$=max. $(x, y)$, $(xyz_Q$=max. $(x, y, z)$, and so on, which function may be made equivalent to every desired Boolean function.

The term "matrix" as used herein is to be understood to denote a system of magnetic cores arranged in rows and columns, a row comprising the cores which together relate to a coded information (often referred to as "word"), while a column comprises the cores which relate to one and the same digit position of the coded information. Generally, the cores are so connected to the elements of the buffer storage, by means of wires, that each element of the buffer storage is coupled to exactly one core of each row. However, these wires may pass through the matrix in a staggered manner, that is to say, such a wire may couple one element of the buffer storage to matrix cores belonging to various columns. The matrix may comprise a single column only or it may be incomplete, that is to say, cores may be missing at certain points.

The term "micro-control" is used herein to denote the part of the circuit arrangement which controls the carrying out of certain composite orders or micro-program to be performed by the logical member (for example, the performance of an addition or multiplication, if the member is the arithmetic unit of a computer). The term "macro-control" is used herein to denote the part of the circuit arrangement which selects a certain sequence of micro-program.

Embodiments of the invention will now be described with reference to the accompanying diagrammatic drawings and tables.

FIG. 8 is a table serving to illustrate the operation of the arithmetic unit of FIG. 5.

FIG. 9 is a table serving to illustrate the operation of the arithmetic unit of FIG. 6.

FIG. 10 is a table giving a summary of the linear algebraic functions which are equivalent to all types of irreducible Boolean functions of 0, 1, 2 and 3 variables.

Figure 1:
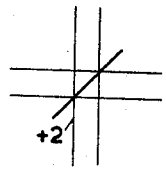
FIGS. 1, 2, 3 and 4 show the symbols used for circuit elements.
Figure 2:
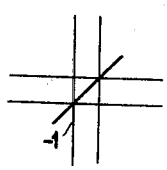

FIGURES 1, 2, 3 and 4 show the symbols for certain circuit elements used in the following figures. FIGS. 1 and 2 show the symbol used to represent a ring made of a magnetic material having a rectangular hystersis loop. The plane of the ring is assumed to be at right angles to the plane of the drawing, so that the ring takes the form of a short heavy line drawn at an angle of 45°. A number of wires, which in FIGS. 1 and 2 are indicated by the two horizontal and the two vertical lines, are threaded through the ring. The directions in which these wires are threaded through the ring can be seen from the figures, except for the wires provided with indications such as +2, −1. The indication +2 (FIG. 1) denotes that the wire is twice threaded through the ring in a direction corresponding to the figure. The indication −1 (FIG. 2) denotes that the wire is once threaded through the ring in a direction opposite to the direction shown in the figure. In this system, +1 should be used to denote that the wire is once threaded through the ring in the direction shown by the figure; however, there is no need for this indication and hence it is omitted.

Figure 3:
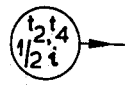

FIGURE 3 shows the symbol for a current source which, at instants $t_2$ and $t_4$ of a cycle comprising $p$ instants $t_1, t_2, t_3, t_4 \ldots t_p$, delivers current pulses of value $\frac{1}{2} i$. If there is no indication of the value of the delivered pulse, this means that this value is not critical for the operation of the circuit arrangement, and hence only has to exceed a certain threshold value.

Figure 4:
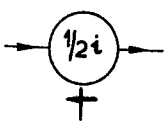

FIGURE 4 shows the symbol for a storing pulse generator which, when fired, delivers current pulses of value $\frac{1}{2} i$. The term "storing pulse generator" is used herein to denote a circuit having a setting terminal (shown in the drawings by a cross-line), a firing terminal (shown in the drawings by an arrow pointing towards the circle representing the storing pulse generator) and an output terminal (shown in the drawings by an arrow pointing away from the circle representing the storing pulse generator). If a pulse of a certain polarity is applied to the setting terminal (the setting of the storing pulse generator) and subsequently a pulse of a certain polarity is applied to the firing terminal (the firing of the storing pulse generator), the generator delivers an output pulse. However, if a pulse is applied to the firing terminal without the storing pulse generator having been set, the generator delivers no output pulse. Thus, a fired storing pulse generator cannot deliver an output pulse again unless it has again been set. Hence a storing pulse geenrator has a memory function, since it can retain its (set or unset) condition for an indefinitely long period of time. A circuit arrangement having these properties can be readily built up from known circuit elements. Preferably, a ring made of a magnetic material having a rectangular hysteresis loop is used as the memory element of the cocking gate. In the drawings, it is assumed that the current sources and the storing pulse generators deliver current pulses in a direction away from the current source or storing pulse generator; it will, however, be obvious that this assumption is not essential.

Figure 5:
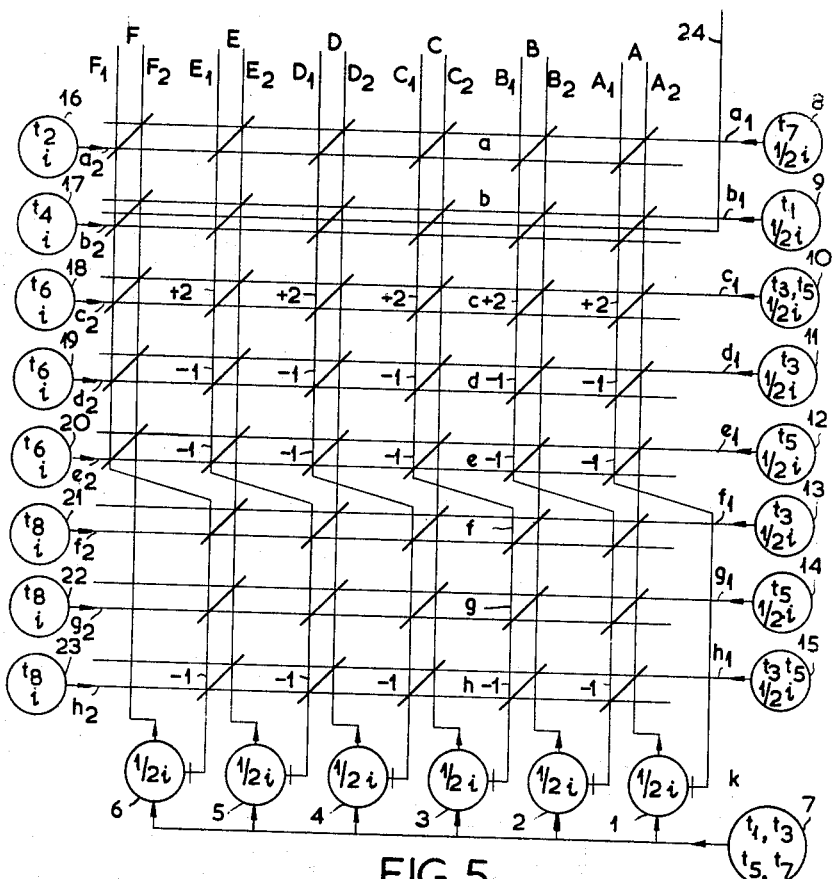
FIGS. 5 and 6 show two arithmetic units in accordance with the invention.

FIG. 5 shows the principle of a binary adder in accordance with the invention, which operates in adding cycles each comprising eight instants. This means that eight instants succeed one another cyclically, that is to say ... $t_6$, $t_7$, $t_8$, $t_1$, $t_2$, $t_3$, $t_4$, $t_5$, $t_6$, $t_7$, $t_8$, $t_1$, $t_2$ .... The adder can perform additions of two numbers written in the binary scale of notation and comprising six digits each. Obviously, this number is chosen so low in order to simplify the drawings and the description. The adder substantially comprises a matrix of rings made of a magnetic material having a rectangular hysteresis loop, the rings being arranged in six columns, which are designated by the capital letters A, B, C, D, E, F, and eight rows, which are designated by the small letters $a$, $b$, $c$, $d$, $e$, $f$, $g$, $h$. Through each column and through each row are threaded two wires, which are designated $A_1$, $A_2$ ... and $a_1$, $a_2$ ..., respectively. The wires $A_1$, $B_1$, ... $F_1$ which are referred to as signal wires, are connected at the lower end of the matrix to the setting terminals of storing pulse generators 1, 2, ... 6, the wires $A_2$, $B_2$ ... $F_2$, which are referred to as re-write wires, are connected at the lower end of the matrix to the output terminals of the generators 1, 2 ... 6. The firing terminals of these generators are all connected together and to the output terminal of a pulse source 7, which delivers a pulse at the instants $t_1$, $t_3$, $t_5$ and $t_7$ of the cycles. When fired, the storing pulse generators deliver current pulses of value ½ $i$. The wires $a_1$, $b_1$, ... $h_1$, which are referred to as coincidence wires, are connected, at the right-hand side of the matrix, to pulse sources 8, 9, ... 15, which at the inscribed instants deliver current pulses of value ½ $i$. The wires $a_2$, $b_2$, ... $h_2$, which are referred to as read-out wires, are connected, at the left-hand side of the matrix, to pulse sources 16, 17, ... 23, which deliver current pulses of value $i$ at the inscribed instants. Obviously, the pulse sources 8, 9, ... 23 may be storing pulse generators. As will be seen from FIG. 5, the signal wires $A_1$, $B_1$, ... $F_1$ are threaded through the columns of the matrix in a staggered manner and, in addition, twice through the rings of the row $c$, and once but in the opposite sense, through the rings of the rows $d$, $e$ and $h$. This is indicated in FIG. 5 by +2 and −1.

Each ring can be in one of two opposite conditions of magnetisation, these being denoted by the digits 0 and 1. It will be assumed that the pulses delivered by the pulse sources 16, 17, ... 23 drive the rings to the condition 0, while the pulses delivered by the pulse sources 8, 9, ... 15 or by the storing pulse generators 1, 2, ... 6 drive the rings to the condition 1 unless the corresponding windings are provided with the symbol −1, in which case the rings are driven to the condition 0. The value $i$ is chosen so that a current pulse having an amplitude $i$ is capable of flipping over a ring with certainty, it also being certain that a current pulse of amplitude ½ $i$ will never be capable thereof.

The circuit arrangement operates as follows. It is assumed that, at an instant $t_1$, the two binary numbers $x$ and $y$, which are to be added to one another, are written in the rings of the rows $a$ and $b$ (see the table of FIG. 8, which refers to a single arbitrary column or digit place). This writing of the numbers $x$ and $y$ into the rings can be effected in known manner, for example by coincidence. For the sake of simplicity, the concerned part of the circuit has been omitted in the drawing. At the instant $t_2$, the current source 16 supplies a current pulse of value $i$, so that all the rings of the row $a$ are set to the condition 0 but the information $x$ stored in this row is transferred to the row of the storing pulse generators 1, 2, ... 6. In FIG. 5 and FIG. 8, this row is indicated by $k$. This means that, for example, the storing pulse generator 3 is not set, if the ring at the crossing of column C and row $a$ was in the condition 0, but is set if this ring was in the condition 1. In the first case, the current pulse supplied by the pulse source 16 does not cause this ring to flip over, since this pulse drives to the condition 0 and the ring was already in this condition 0. Hence, no pulse is induced in the signal wire $C_1$. In the second case, the current pulse supplied by the pulse source 16 causes the ring to flip over from the condition 1 to the condition 0, so that a pulse is induced in the signal wire $C_1$ and this pulse sets the storing pulse generator 3. Thus, in the column $k$ of the cocking gates 1, 2, ... 6, the information 0 corresponds to an unset pulse generator and the information 1 to a set pulse generator. At the subsequent instant $t_3$, pulses are applied to the firing terminals of all the storing pulse generators, owing to the fact that at this instant the pulse source 7 supplies a pulse; simultaneously the pulse sources 10, 11, 13 and 15 each supply a pulse. Consequently, the information $x$ is transferred to the rows $c$, $d$, $f$ and $h$ by coincidence. Because the storing pulse generators 1, 2, ... 6 and the pulse sources 8, 9, ... 15 deliver current pulses of amplitude ½ $i$, only rings in the columns of which the storing pulse generators were set can be caused to pass to the condition 1. All this can readily be appreciated from the table of FIG. 8. At the instant $t_4$, the information $y$ is transferred from row $b$ to the row $k$ of storing pulse generators, while at the instant $t_5$ this information is transferred to the rows $c$, $e$, $g$ and $h$ by coincidence. Hence, the rows $d$ and $f$ now contain the information $x$, the rows $e$ and $g$ the information $y$, the rows $c$ and $h$ the information denoted by $(xy)$, while the rows $a$ and $b$ no longer contain any information and are empty. Here $(xy)$ in the information which has the value 0, if $x=y=0$, and which has the value 1, if either $x$ or $y$ have the value 1 (hence, also if $x=y=1$). Thus, this symbol is an abbreviated notation of $x$, $y$ and max. $(x, y)$. At the next subsequent instant $t_6$, the information stored in the rows $c$, $d$ and $e$ is transferred to the row of storing pulse generators $k$. However, owing to the special manner of threading the signal wires through the matrix columns, the signal applied to the setting terminal of a pulse generator has the value $2(xy)-x-y$. It will be appreciated that this expression has the value 0, if $x=y=0$ or if $x=y=1$, while the expression has the value 1, if $x=1$, $y=0$ or if $x=0$, $y=1$. However this is precisely the binary sum of the two numbers $x$ and $y$, so that $2(xy)-x-y=s$. At the instant $t_7$, the information $s$ is transferred from the row $k$ to the row $a$ by coincidence. At the next subsequent instant $t_8$, the information stored in the rows $f$, $g$ and $h$ is simultaneously transferred to the row of storing pulse generators. Owing to the special manner of threading the signal wires through the columns, the signal applied to the setting terminal of a storing pulse generator has the value $-(xy)+x+y$. This expression has the value 1, if $x=y=1$, but the value 0 in all other cases, and hence corresponds to the carry $c$. At the instant $t_1$, which succeeds the instant $t_8$ again, this information is transferred by coincidence to the row $b$, while the staggered manner of threading the signal wires $A_1$, $B_1$, ... $F_1$ causes the carry to be shifted automatically one digit place to the left, as is required arithmetically. The same effect can obviously be obtained by threading the re-write wires $A_2$, $B_2$, ... $F_2$, through the matrix columns in a staggered manner. Thus, the addition of the numbers $x$ and $y$ now is reduced to the addition of the numbers $s$ and $c$. Hence, this process must be continued until the row $b$ in which the carry $c$ is written, is empty. This can be checked by means of a signal wire 24 threaded through all rings of the row $b$. As long as this row has a carry which differs from 0, the reading of this row produces a pulse in the wire 24 and this pulse is utilised to initiate a new cycle. If, on reading of the row $b$, there is no pulse in the wire 24, this means that this row was empty, that is to say, that there is no longer a carry to be handled.

The operation of the above described arithmetical unit is based on the fact that the Boolean functions:

$$s = x\bar{y} \vee \bar{x}y, \quad c = xy$$

are equivalent to the algebraic functions:

$$s = 2(xy) - x - y, \quad c = (xy) + x + y$$

In these formulas, $x$, $y$, $s$ and $c$ assume only the values 0 and 1, while $(xy)$ has the above defined meaning. Hence, if the items of information $x$, $y$ and $(xy)$ are available (this requires four instants in the circuit arrangement shown in FIG. 5), the items of information $s$ and $c$ can each be found in two instants. Obviously, the circuit arrangement may alternatively be designed so that, when the information $x$ is recorded, it is immediately written in the rows $c$, $d$, $f$ and $h$, while the information $y$, when recorded, is immediately written in the rows $c$, $e$, $g$ and $h$. Thus, no additional instants are required to form the information $(xy)$, $x$ and $y$ in order to produce the information $s$, or to form the information $x$, $y$, and $(xy)$ in order to produce the information $c$. Hence, it may be of advantage to provide the arithmetical member with a number of additional rows to enable auxiliary information which is required to produce other information, to be formed as rapidly as possible.

Now every Boolean function can be replaced by a linear function of the variables $x$, $y$, $z$, $\ldots$ $(xy)$, $(xz)$, $\ldots$ $(xyz)$, $\ldots$. Here, $(xyz)$ obviously means max. $(x, y, z)$, that is to say, a quantity which has the value 1, if at least one of the three quantities $x$, $y$ and $z$ has the value 1, and which has the value 0, if $x=y=z=0$. This is illustrated in the table shown in FIG. 10 for functions of no, one, two and three variables. Column A contains the twenty-three types of irreducible Boolean functions which can be formed with no, one, two or three variables. Of each group of functions which are converted into each other by permutations of the letters $x$, $y$ and $z$, which permutations may be associated with negation, only a single function is entered in the table as a representative of the group concerned. Of the group of the functions $xy \vee xz$, $yx \vee yz$, $\bar{z}y \vee \bar{z}x$, $\ldots$ and so on, for example, only the first is included in the table, line 11. The term "irreducible Boolean function" is used herein to denote a disjunction of conjunctions which cannot be written as an adjunction of a lesser number of conjunctions. We will consider, for example, the function $$x\bar{y}\bar{z} \vee \bar{x}yz \vee \bar{x}\bar{y}\bar{z} \vee \bar{x}y\bar{z}$$

This can also be written $$x\bar{y}\bar{z} \vee \bar{x}y\bar{z} \vee \bar{x}yz \vee$$

or $$(x+\bar{x})\bar{y}\bar{z} \vee \bar{x}y(z \vee \bar{z})$$

that is to say $$\bar{y}\bar{z} \vee \bar{x}y$$

If, in this expression, $x$ is replaced by $\bar{z}$, $y$ by $x$ and $z$ by $\bar{y}$, the function $xy \vee xz$ of line 11 is obtained. According to the table, this function is equivalent to the algebraic function $-(xyz) + (yz) + x$. Hence, according to the table, $\bar{y}\bar{z} \vee \bar{x}y = -(\bar{x}y\bar{z}) + (\bar{x}\bar{z}) + y$ (cf. line 11, column B of the table). However, it can readily be determined that $$\bar{y}\bar{z} \vee \bar{x}y = -(xyz) + (yz) + (zx) + (xy) - x - z$$

also. It will be appreciated that the table of FIG. 10 can be extended to include functions of any number of variables.

It should also be noted that many Boolean functions are equivalent to a linear form, which has integral coefficients, of the variables and their negations contained in the Boolean function concerned. A negative value or 0 must then be interpreted as 0, a positive value as 1. Of the irreducible functions included in the table of FIG. 10 to which this applies, equivalent linear forms are given in column C. These expressions are not unique since, for example, $xy = x - \bar{y} = \bar{x} + y$.

Line 17 of the table of FIG. 10 shows, for example, $c = yz \vee zx \vee xy = x+y-\bar{z}$, so that, in the case of an addition of three binary numbers, the carry can be produced very rapidly. However, according to line 23 of the table, there is no linear form equivalent to the sum of three binary numbers. But we can write:

$$s = xyz + x\overline{yz} + \overline{x}y\overline{z} + \overline{xy}z = xyz$$
$$+ (x \vee y \vee z)\bar{c} = xyz \vee x\bar{c} \vee y\bar{c} \vee z\bar{c}$$

However $$xyz \vee xu \vee yu \vee zu = x+y+z-2\bar{u}$$

so that we finally find:

$$s = x+y+z-2c$$

Figure 6:
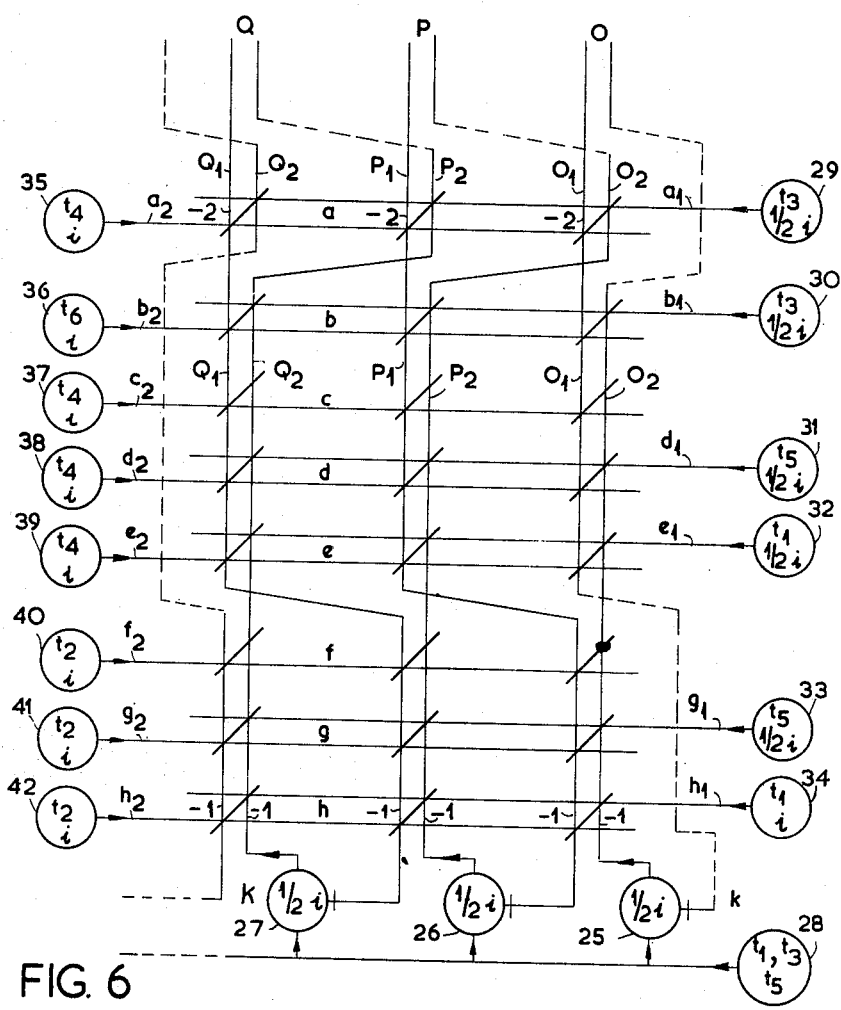

FIG. 6 shows the circuit diagram of an arithmetical unit based on these formulas, while the table shown in FIG. 9 illustrates the operation thereof. The matrix contains eight rows, which are again designated by the letters $a$, $b$, $c$, $d$, $e$, $f$, $g$, $h$. Only three columns of the matrix are shown, which are designated O, P and Q. Otherwise, the arithmetical unit is similar to the arithmetical unit shown in FIG. 5. Elements 25, 26, 27 are storing pulse generators which together form a buffer storage $k$ and can be fired by a pulse source 28; elements 29, 30, . . . 33 are current pulse sources which deliver current pulses of value $\frac{1}{2} i$ at the inscribed instants and elements 34, 35, . . . 42 are current pulse sources which supply current pulses of value $i$ at the inscribed instants.

This arithmetical unit operates as follows: (cf. the table of FIG. 9). If $x$ and $y$ are the two numbers to be added to one another, they are written in known manner in the rows $c$, $d$, $f$, $g$ at the instant $t_1$. This may, but need not, be effected by coincidence. In order to simplify the figure, the relevant part of the circuit arrangement is omitted. Furthermore, the rows $e$ and $h$ may contain the carry $c_i$ from a preceding addition, which carry is referred to as input carry in this connection. This input carry is written in the rows $e$ and $h$, so that the row $e$ contains the information $c_i$, but the row $h$ the information $\bar{c}_i$. At the instant $t_2$, the current pulse sources 40, 41 and 42 supply a current pulse of amplitude $i$, so that the information $c_u = x+y-\bar{c}_i$ is written in the buffer storage and the rows $f$, $g$ and $h$ are emptied. At the subsequent instant $t_3$, pulses are applied to the firing terminals of the storing pulse generators 25, 26 and 27 of the buffer storage $k$, while current pulse sources 29 and 30 also supply a current pulse of amplitude $\frac{1}{2} i$. As a result, the information $c_u$ is written in the rows $a$ and $b$. Owing to the staggered manner in which the signal wires and the re-write wires are threaded through the columns of the matrix, the carry is not shifted in column $a$, but is shifted one digit place to the left in column $b$. This is shown in the table of FIG. 9 by an asterisk. At the instant $t_4$, the current pulse sources 35, 37, 38 and 39 deliver a current pulse of a value $i$, so that the information $s = x+y+c_i-2c_u$ is written in the buffer storage $k$ and the rows $a$, $b$, $c$, $d$ and $e$ are emptied. It should be pointed out that in the expression $x+y+c_i-2c_u$ the unshifted output carry, that is to say, the information written in the row $a$, must be used for $c_u$. At the subsequent instant $t_5$, the buffer storage $k$ is fired again and the current pulse sources 31 and 33 supply a current pulse of value $\frac{1}{2} i$. As a result, the information $s$ is transferred from the buffer storage to the rows $d$ and $g$. At the instant $t_6$, the current pulse source 36 delivers a current pulse of value $i$, so that the shifted information $c_u$ stored in the row $b$ is transferred to the buffer storage $k$. At the subsequent instant $t_1$, the buffer storage is fired again, the current pulse source 32 delivers a current pulse of value $\frac{1}{2} i$ and the current pulse source 34 delivers a current pulse of value $i$. As a result, the information $c_u$ is written in the row $e$ and the information $\bar{c}_u$ is written in the row $h$. This is self-evident with respect to the row $e$. With respect to the row $h$, it should first be noted that this row was set to the condition 0 at the instant $t_2$ preceding the instant $t_1$ concerned. At the instant $t_1$, the ring of column P and of row $h$ received the information $-\frac{1}{2}c_u+i$ from the storing pulse generator 26 and the source 34. This expression is equal to $\frac{1}{2}i$, if $c_u=1$ and it is equal to $i$, if $c_u=0$. Hence, the ring concerned in the row $h$ remains in the condition 0, if $c_u=1$, while it passes to the condition 1, if $c_u=0$. Thus, in actual fact, the information $\bar{c}_u$ is written in the row $h$. At the same time, a new number $x_1$, which must be added to the sum $x+y$, can be written in the rows $c$ and $f$. At this instant, however, a situation has arisen which is equal to the initial situation, except that the number $s$ is substituted for the number $y$, for, with respect to the subsequent addition, the shifted output carry $c_u$ is an input carry.

The arithmetical unit in accordance with the invention may form part of a larger storage matrix built up from magnetic rings. The remaining rows of this storage matrix can be used for the memory proper of the computer and for its macro-control.

Figure 7:
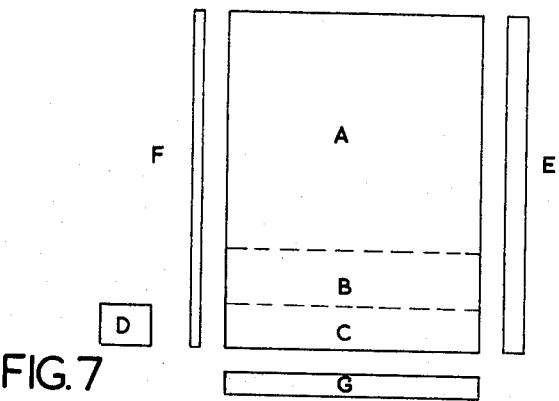
FIG. 7 shows diagrammatically the generally structure of a computer using an arithmetic units in accordance with the invention.

The micro-control of the arithmetical unit (or, in general, of the logical member) substantially is a composite pulse generator having a number of output terminals at which pulses of the desired values are produced in cyclic sequence. Such a pulse generator can be built on known principles. If the micro-control must be capable of providing at least two micro-programs, that is to say, pulse trains comprising different numbers of pulses per cycle which must be delivered in various cyclic sequences, in practice preferably use is made for this purpose also in known manner of a matrix comprising magnetic rings. Each combination of pulses to be delivered at a certain instant $t_k$ corresponds to a wire threaded in a certain manner through this auxiliary matrix. As soon as a read-out pulse is passed through such a wire of the auxiliary matrix, a pulse (or a combination of pulses) is also generated which determines the next wire of the auxiliary matrix through which a read-out pulse must be sent. This is of particular importance in practice, if certain rows of the logical member are used more than once in the same micro-program, as is the case, for example, in the arithmetical unit shown in FIG. 5. By using the above idea, a computer is obtained of the structure shown diagrammatically in FIG. 7. In this figure, A, B and C together constitute a single matrix built from magnetic rings, the part A forming the storage of the computer and the part B serving to fix the micro-program, while the part C constitutes the arithmetical unit of the computer. Furthermore, D is the above-described auxiliary matrix and E, F and G form the marginal apparatus which comprises pulse sources, for example storing pulse generators. Due to its simplicity a computer built in this manner is very effective and reliable in operation.

What is claimed is:

1. An arithmetic unit comprising: a matrix composed of magnetic cores having a rectangular hysteresis loop arranged in a predetermined number of rows and columns, a buffer storage comprising a plurality of storage elements at least equal in number to the number of columns in the matrix, each storage element having at least one input terminal which is coupled to a first plurality of cores in a predetermined manner by means of a wire connected to said input terminal and threading said first plurality of cores in series, each storage element also comprising an output terminal coupled to a second plurality of cores in a predetermined manner by means of a wire connected to said output terminal and threading said second plurality of cores in series, first current sources coupled to selected matrix rows, means for selectively actuating said first current sources to transfer information from these rows selectively to the associated storage elements, the current generated by each of said first sources having an amplitude sufficient to change-over an associated core from one remanent condition to another, second current sources coupled to selected matrix rows, the current generated by each second source and each storage element having one-half the amplitude sufficient to change-over an associated core from one remanent condition to another, means for selectively actuating said second current sources and simultaneously actuating said storage elements, thereby transferring by coincidence the information stored by said storage elements in selected cores, the wires coupling said current sources and storage elements to associated cores being wound on said cores in a direction and with a number of turns such that the sum of two numbers initially stored in the matrix is subsequently stored in the matrix.

2. A logical member composed of magnetic cores of a material having a rectangular magnetic hysteresis loop arranged according to a matrix having a predetermined number of rows and columns, a buffer storage having at least as many storage elements as the matrix has columns, the input terminal of each storage element of said buffer storage being coupled with a number of cores of the matrix by means of series connected windings having a predetermined number of turns and winding senses such that the amplitudes of the voltage pulses induced in the individual windings during the flipping-over of the corresponding cores are not all the same and the amplitudes of the voltage pulses applied to the input terminals of the storage elements of the buffer storage are linear functions of Boolean variables, the coefficients of which are positive or negative integer multiples of the amplitude of the voltage pulse induced in a winding with one turn of a flipping-over core, said linear function being representative for any desired Boolean function dependent on the numbers of turns and winding senses of said windings.

References Cited by the Examiner

UNITED STATES PATENTS 2,973,508   2/61   Chadurjian _____ 340—166

MALCOLM A. MORRISON, *Primary Examiner.*

IRVING L. SRAGOW, EVERETT R. REYNOLDS,
*Examiners.*